F. A. ANTON.
AWNING ARM BRACKET.
APPLICATION FILED OCT. 4, 1912.
1,069,515.
Patented Aug. 5, 1913.
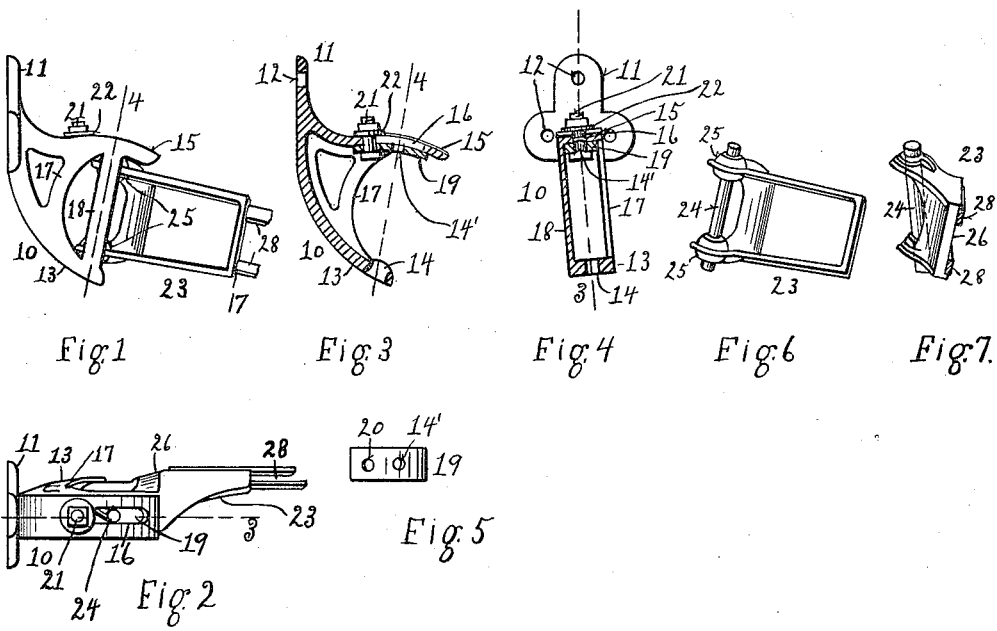

UNITED STATES PATENT OFFICE.

FREDERICK A. ANTON, OF TOPEKA, KANSAS.

AWNING-ARM BRACKET.

1,069,515.      Specification of Letters Patent.      Patented Aug. 5, 1913.

Original application filed July 1, 1910, Serial No. 569,903. Divided and this application filed October 4, 1912. Serial No. 723,872.

*To all whom it may concern:*

Be it known that I, FREDERICK A. ANTON, a citizen of the United States, and a resident of the city of Topeka, in the county of Shawnee and State of Kansas, have invented a new and useful Improvement in Awning-Arm Brackets, of which the following is a specification.

In Patent No. 986,120, granted to me March 7, 1911, I have shown a type of laterally foldable awning arm to which my present invention is applicable; and in application Serial No. 569,903, filed by me July 1, 1910, for improvements in awning arms, I have shown further improvements in such awning arms, and have further shown but not claimed the bracket herein described and claimed, the present application being filed as a division of that application.

The object of this invention is to provide a strong, durable, simple, and efficient bracket for a laterally foldable awning arm, which bracket is provided with means for adjusting the dip of the arm; and it comprises the parts, improvements, and combinations hereinafter set forth and claimed.

In the drawings accompanying and forming part of this specification and in the description of the drawings, I have shown my invention in its preferred form and what I deem to be the best mode of applying the principles thereof; but it is to be understood that my invention is not confined to the exact details of such drawings and description, and that, within the scope of the appended claims, I contemplate changes in form, proportions, and materials, the transposition of parts, and the substitution of equivalent members, without departing from the spirit of my invention.

Figure 1 is a side elevation of an awning arm bracket made in accordance with the principles of my invention with a portion of the awning arm hinged thereto. Fig. 2 is a top or plan view of the same. Fig. 3 is a vertical sectional elevation taken on the plane indicated by the line 3 in Fig. 4. Fig. 4 is a transverse sectional elevation taken on the plane indicated by the line 4 in Fig. 3. Fig. 5 is a plan view of the adjusting block, detached. Fig. 6 is a side elevation of the inner hinge member of the awning arm which is supported by the bracket. Fig. 7 is an end elevation of that member.

Similar reference characters indicate similar parts throughout the several views.

10 is a bracket adapted to be secured to the front of a building at the top of the window to be protected by the awning, as by the face-plate 11 and bolts or lag-screws passing through the several holes 12, 12, 12. The bracket has a lower arm 13 with a hole 14 therein and an upper arm 15 with a slot 16 therein. The two arms are connected and the bracket suitably reinforced by the webs 17, 17, 18.

19 is a bearing block having therein a hole 20; and 21 is a bolt extending through said hole and the slot in the upper arm for clamping the block securely to the upper arm at any point permitted by the length of the slot. A washer 22 is preferably provided between the slot and the head or nut of the bolt. The face of the upper arm to which the adjusting block is clamped describes an arc on a radius extending from the hole 14 in the lower bracket arm, so that by shifting the block inwardly and outwardly the hole 14 in the lower arm and the hole 14' in the block may be disposed at various angles to the line of the face plate or building. The line between these two holes is inclined outwardly from the bottom up, and also laterally (see especially Fig. 4).

23 is the inner hinge member for the arm, and it has, preferably formed integrally with it, a pin 24 which is adapted to bear in the holes 14 and 14'; and this pin is preferably secured in the two lugs 25, 25 of said hinge member. This member is also of the special form indicated in the drawings, with its side face 26 inclined at such an angle that when the member is secured in its bearings, this face will incline laterally at an angle opposite to the lateral angle of incline of the pin 24. Secured to this face are the two steel bars 28, 28 which are extended to form part of the awning arm proper, said awning arm proper being fully described in said prior patents. To give the awning the proper dip to adapt it to any particular building, the block is shifted and secured in proper position by means of the bolt 21.

For purposes of economy, lightness, strength, and durability, the bracket is made preferably of malleable iron. Also the brackets are made in rights and lefts in order to permit the awning arms to be swung to the right or left, the arms to which I have reference being made in such pairs.

What I claim is:

1. The combination of a bracket having two arms, one of said arms forming a bearing for an awning arm, and an adjustable block in the other arm forming another bearing for the awning arm.

2. The combination of a bracket having a face-plate for securing it to a building, a lower bearing arm having a hole therein, and an upper arm having a slot therein and having one of its faces formed on an arc with a radius extending from said hole, a bearing block fitted to said face and having a hole therein, and a bolt extending through said block and said hole for adjustably securing said block to said face.

3. The combination of a bracket having two arms one of said arms forming a pivot bearing for a laterally foldable awning arm, and a block adjustably secured to the other arm and forming another pivot bearing for said awning arm.

In testimony whereof I have affixed my signature in presence of two witnesses.

FREDERICK A. ANTON.

Witnesses:
B. W. CARTER,
J. M. STARK.